(12) United States Patent
Edwards et al.

(10) Patent No.: US 12,380,421 B2
(45) Date of Patent: Aug. 5, 2025

(54) ENHANCED CREDENTIAL SECURITY BASED ON A USAGE STATUS OF A WEARABLE DEVICE

(71) Applicant: Capital One Services, LLC, McLean, VA (US)

(72) Inventors: Joshua Edwards, Philadelphia, PA (US); Michael Mossoba, Great Falls, VA (US); Sarvani Kare, Clarksville, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/660,131

(22) Filed: Apr. 21, 2022

(65) Prior Publication Data
US 2023/0342748 A1    Oct. 26, 2023

(51) Int. Cl.
*G06Q 20/30* (2012.01)
*G06Q 20/32* (2012.01)
*G06Q 20/40* (2012.01)

(52) U.S. Cl.
CPC ..... *G06Q 20/321* (2020.05); *G06Q 20/40145* (2013.01)

(58) Field of Classification Search
CPC ............ G06Q 20/321; G06Q 20/40145

USPC .......................................................... 705/44
See application file for complete search history.

(56) References Cited

U.S. PATENT DOCUMENTS

| | | | | |
|---|---|---|---|---|
| 9,632,532 B2* | 4/2017 | Luna | ............ | G06F 3/0634 |
| 9,719,871 B2* | 8/2017 | Blum | ............ | G06F 3/013 |
| 9,800,570 B1 | 10/2017 | Bleisch | | |
| 10,357,203 B2* | 7/2019 | Takahashi | ............ | A61B 5/6824 |
| 10,477,319 B2* | 11/2019 | Lou | ............ | H04R 5/033 |
| 2016/0267732 A1* | 9/2016 | Agrafioti | ............ | A61B 5/318 |
| 2017/0301214 A1* | 10/2017 | Chen | ............ | A61B 5/1112 |

* cited by examiner

Primary Examiner — Clifford B Madamba
(74) Attorney, Agent, or Firm — Harrity & Harrity, LLP

(57) ABSTRACT

In some implementations, a device may receive a request to generate a virtual credential associated with an account of a user. The device may transmit an indication of the virtual credential, wherein the virtual credential is to be transmitted by a wearable device. The device may communicate, with the wearable device, to identify a usage status of the wearable device, wherein the usage status indicates whether the wearable device is being worn by the user. The device may perform an action, to secure the virtual credential based on communicating with the wearable device and based on the usage status, including: maintaining, by the device, a validity of the virtual credential based on the usage status indicating that the wearable device is being worn by the user; or invalidating, by the device, the virtual credential based on the usage status indicating that the wearable device has been removed from the user.

20 Claims, 6 Drawing Sheets

410 — Receive an indication of a temporary credential, to be stored by the wearable device, associated with an account of a user that is associated with the wearable device, wherein receiving the indication of the temporary credential enables the wearable device to provide the temporary credential to a terminal, based on detecting that the wearable device is within a communicative proximity of the terminal, to initiate an exchange associated with the account

420 — Monitor, via one or more sensors, the usage status of the wearable device, wherein the usage status indicates whether the wearable device is being worn by the user

430 — Detect, via the one or more sensors and based on monitoring the usage status, that the wearable device has been removed from the user for a threshold amount of time

440 — Transmit, to a device associated with the account and based on detecting that the wearable device has been removed from the user, an indication that the wearable device has been removed from the user to cause the temporary credential to be expired

FIG. 4

ENHANCED CREDENTIAL SECURITY BASED ON A USAGE STATUS OF A WEARABLE DEVICE

BACKGROUND

A wearable device is a smart electronic device (e.g., electronic device with micro-controllers) that may be worn close to and/or on the surface of the skin, where the wearable device may detect, analyze, and transmit information, such as body signals, vital signs, data associated with an application executing on the wearable device, and/or ambient data. In some examples, a wearable device may provide information associated with an account to facilitate a contactless transaction. For example, in a contactless transaction, the wearable device may be linked to a card. The wearable device can be waved over a reader at a terminal. Accordingly, contactless transactions are generally made in close physical proximity to a terminal, unlike mobile transactions that utilize wide area cellular networks and/or wireless local area networks to transfer transaction card data without requiring close physical proximity.

SUMMARY

Some implementations described herein relate to a wearable device for enhanced credential security based on a usage status of the wearable device. The wearable device may include one or more sensors, one or more memories, and one or more processors coupled to the one or more memories. The one or more processors may be configured to receive an indication of a temporary credential, to be stored by the wearable device, associated with an account of a user that is associated with the wearable device, wherein receiving the indication of the temporary credential enables the wearable device to provide the temporary credential to a terminal, based on detecting that the wearable device is within a communicative proximity of the terminal, to initiate an exchange associated with the account. The one or more processors may be configured to monitor, via the one or more sensors, the usage status of the wearable device, wherein the usage status indicates whether the wearable device is being worn by the user. The one or more processors may be configured to detect, via the one or more sensors and based on monitoring the usage status, that the wearable device has been removed from the user for a threshold amount of time. The one or more processors may be configured to transmit, to a device associated with the account and based on detecting that the wearable device has been removed from the user, an indication that the wearable device has been removed from the user to cause the temporary credential to be expired.

Some implementations described herein relate to a method of enhanced credential security based on a usage status of a wearable device of a user. The method may include receiving, by a device, a request to generate a temporary credential associated with an account of the user, wherein the temporary credential is associated with an expiration time at which the temporary credential will automatically expire. The method may include transmitting, by the device, an indication of the temporary credential, wherein the temporary credential is to be transmitted by the wearable device. The method may include communicating, by the device and with the wearable device, to identify the usage status of the wearable device, wherein the usage status indicates whether the wearable device is being worn by the user. The method may include detecting, by the device and based on communicating with the wearable device to identify the usage status, that the wearable device has been removed from the user at a time prior to the expiration time. The method may include performing, by the device, an action to cause the temporary credential to be expired prior to the expiration time based on the wearable device being removed from the user.

Some implementations described herein relate to a non-transitory computer-readable medium that stores a set of instructions for a device. The set of instructions, when executed by one or more processors of the device, may cause the device to receive a request to generate a virtual credential associated with an account of a user. The set of instructions, when executed by one or more processors of the device, may cause the device to transmit an indication of the virtual credential, wherein the virtual credential is to be transmitted by a wearable device. The set of instructions, when executed by one or more processors of the device, may cause the device to communicate, with the wearable device, to identify a usage status of the wearable device, wherein the usage status indicates whether the wearable device is being worn by the user. The set of instructions, when executed by one or more processors of the device, may cause the device to perform an action to secure the virtual credential based on communicating with the wearable device and based on the usage status, wherein the action includes: maintaining a validity of the virtual credential based on the usage status indicating that the wearable device is being worn by the user; or invalidating the virtual credential based on the usage status indicating that the wearable device has been removed from the user.

BRIEF DESCRIPTION OF THE DRAWINGS

FIGS. 4 and 5 are flowcharts of example processes relating to enhanced credential security based on a usage status of a wearable device.

DETAILED DESCRIPTION

Figure 1A:
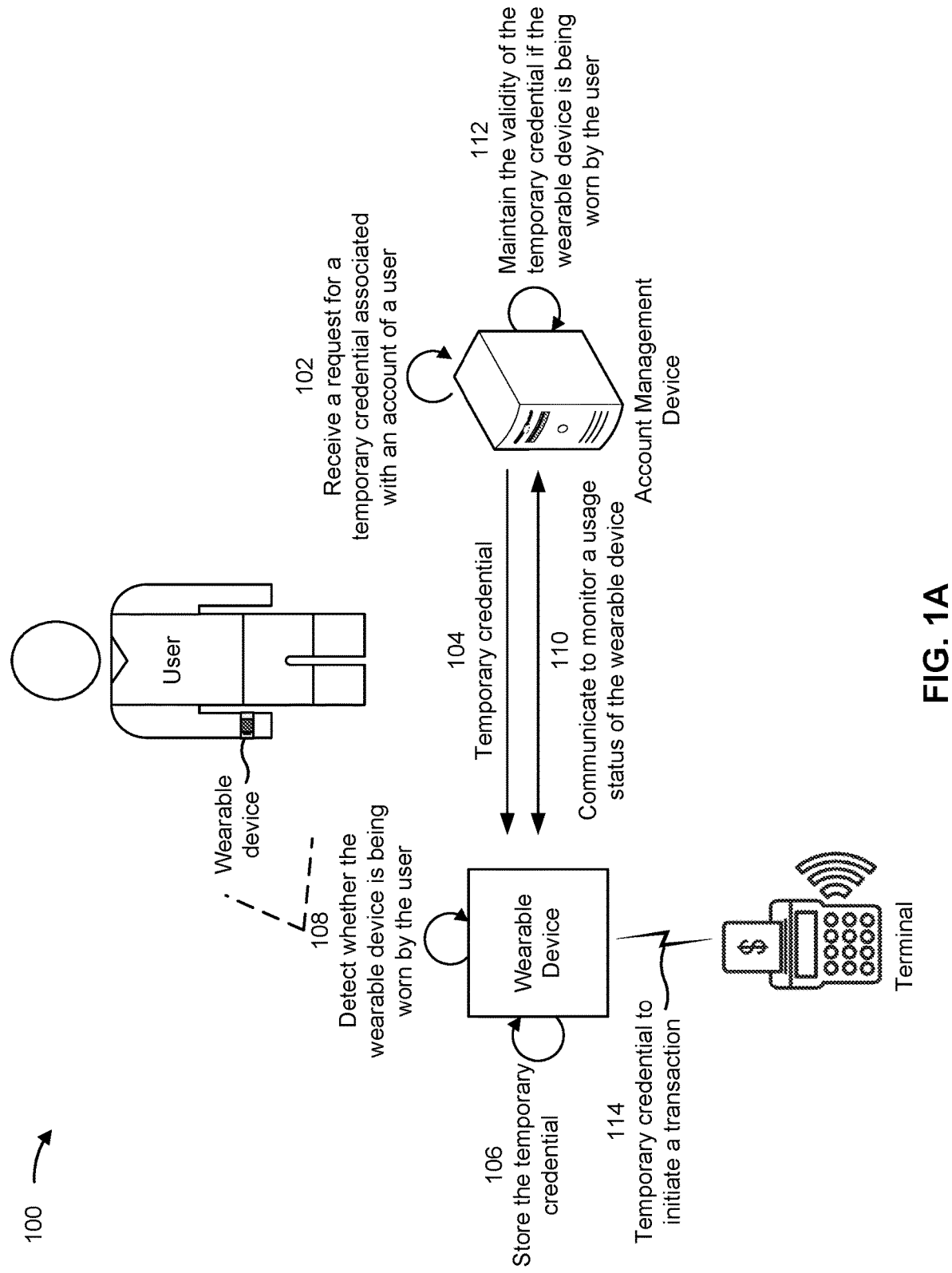
FIGS. 1A and 1B are diagrams of an example implementation relating to enhanced credential security based on a usage status of a wearable device.

The following detailed description of example implementations refers to the accompanying drawings. The same reference numbers in different drawings may identify the same or similar elements.

Contactless payment systems have become increasingly prevalent for various reasons. For example, contactless transactions offer convenience and efficiency to customers and merchants by enabling autonomous checkout with no interaction or minimal interaction between a customer and personnel associated with the merchant. In another example, contactless transactions may be desirable because customers may not want to touch a potentially unsanitary terminal (e.g., transaction terminal) and/or come into close contact with other people (e.g., personnel operating the terminal) that may have a communicable illness. However, existing techniques to enable contactless transactions suffer from various limitations and drawbacks. For example, a wearable device may be used to facilitate a contactless transaction. The wearable device may execute a mobile application that sends a payment to the merchant when the wearable device is placed within a communicative proximity of a terminal. However, these mobile payment techniques have security vulnerabilities because the user sends actual payment credentials to the terminal and/or a third-party provider that sends the payment to the merchant, creating a risk that the payment credentials could be stolen. Furthermore, these mobile payment techniques require additional integration at the terminal to accept payments through the online checkout page and/or to accept tokenized payment information from the third-party provider. Moreover, it is difficult to authenticate that the user that is wearing the mobile device is actually associated with an account that is linked to the mobile application executing on the mobile device. For example, because a wearable device is mobile, a malicious actor may steal or otherwise acquire a user's mobile device and use the mobile device to complete transactions that are charged to an account associated with the user.

In some cases, a temporary credential may be used by a user to increase security associated with the account. A temporary credential, sometimes referred to as a virtual credential, a virtual payment credential, a virtual card number, and/or a virtual credit card, among other examples, is a computer-generated version of a primary payment credential (e.g., a credit card number). "Temporary credential" and "virtual credential" may be used interchangeably herein. The temporary credential may be linked to the primary payment credential and used as a substitute for the primary payment credential in a transaction (e.g., when shopping online, by phone, or in other contexts where a transaction card is not required to be physically presented to a merchant). For example, a bank may issue a transaction card (e.g., a credit card), and a transaction management system of the bank may also issue one or more temporary card numbers that can be used with different merchant transaction systems. In this case, the transaction management system may configure each temporary credential to be associated with a particular merchant. For example, a first temporary credential may only be usable with a first merchant, a second temporary credential may only be usable with a second merchant, and so on. Each temporary credential may be linked to the primary credential in the transaction management system to enable transactions using a particular temporary credential to be charged to an account associated with the primary credential. In some examples, a temporary credential may be associated with one or more other restrictions, such as a monetary restriction (e.g., indicating a maximum amount that can be charged using the temporary credential), and/or a temporal restriction (e.g., indication an amount of time for which the temporary credential is valid), among other examples.

Accordingly, because temporary credentials can generally be used in the same way as an actual transaction card (e.g., except in cases where a physical card has to be swiped or presented in order to verify an identity), temporary credentials can offer increased security in transactions that occur in a context where a physical card is not required to be physically presented to a merchant (e.g., in contactless transactions, when shopping online, by phone, or in other contexts where a transaction card is not required to be physically presented to a merchant). For example, if a security breach at a particular merchant were to result in a first temporary credential being exposed or otherwise compromised (e.g., to a hacker or fraudster), the temporary credential could be used only at the particular merchant and would be unusable with any other merchant(s). In this way, using the temporary credential as a payment method may reduce a risk and/or an extent to which the temporary credential can be fraudulently used, thereby improving information security and/or reducing monetary losses relative to use of a regular payment credential. In such a case, the compromised temporary credential may be invalidated and a new temporary credential may be generated without affecting the primary payment credential and/or any other temporary credentials that may be linked to the primary payment credential. Furthermore, temporary credentials may provide similar protection against phishing scams or other fraud or abuse by unscrupulous merchants. This may minimize an inconvenience associated with issuing a new primary payment credential and may reduce utilization of network resources associated with updating many different merchant systems with new payment credentials.

However, even if a temporary credential is used by a payment application executing on a wearable device for contactless transactions, a malicious actor may still be enabled to complete contactless transactions at a merchant linked to the temporary credential if the malicious actor acquires the wearable device. For example, even if a temporary credential is used for a given contactless transaction, there may be no authentication steps to determine whether the user wearing the wearable device (e.g., that is used to initiate the given contactless transaction) is actually associated with the account that is used to complete the transaction and that is linked to the wearable device. As a result, contactless transactions that are associated with wearable devices may be susceptible to fraud due to the mobile nature of wearable devices and the lack of authentication of the user initiating contactless exchanges using wearable devices.

Some implementations and techniques described herein enable enhanced credential security based on a usage status of a wearable device. For example, a wearable device may store a temporary credential associated with an account (e.g., via a payment application executing on the wearable device) that is to be used to initiate transactions via the wearable device. The wearable device may monitor a usage status of the wearable device. The usage status may indicate whether the wearable device is being worn by the user. For example, the wearable device may include one or more sensors that are configured to monitor biometrics and/or other information associated with the user. The wearable device may be enabled to detect, via the one or more sensors, when the wearable device is removed. In some implementations, if the wearable device detects that the wearable device has been removed from the user, then the wearable device may transmit an indication that the wearable device has been removed from the user to cause the temporary credential to be expired or invalidated. In other words, the temporary credential may remain valid so long as the wearable device is worn by the user. Once the wearable device is removed from the user, the temporary credential may be invalidated and/or expired. For example, an account management device may generate the temporary credential based on receiving a request from the wearable device and/or another device associated with the wearable device or the user. The account management device may authenticate the user and confirm that the user is currently wearing the wearable device (e.g., based on communicating with the wearable device).

As a result, the account management device may authenticate the user and that the user is associated with the wearable device. In some implementations, the account management device may ensure that the user (e.g., that is actually associated with the account) is wearing the wearable device at the time when the temporary credential is generated and/or provided to the wearable device. Additionally, by causing the temporary credential to become expired or invalidated if the wearable device is removed or is no longer worn by the user, the wearable device and/or the account management device may improve a security associated with the account by reducing a likelihood that a malicious actor is able to acquire the wearable device and use the wearable device to complete transactions. For example, even if the malicious actor obtains the wearable device, the temporary credential stored by the wearable device may be useless because the temporary credential would have been expired or invalidated based on the wearable device being removed from the user. As a result, the techniques described herein improve the security of the account based on monitoring the usage status of the wearable device.

Figure 1B:
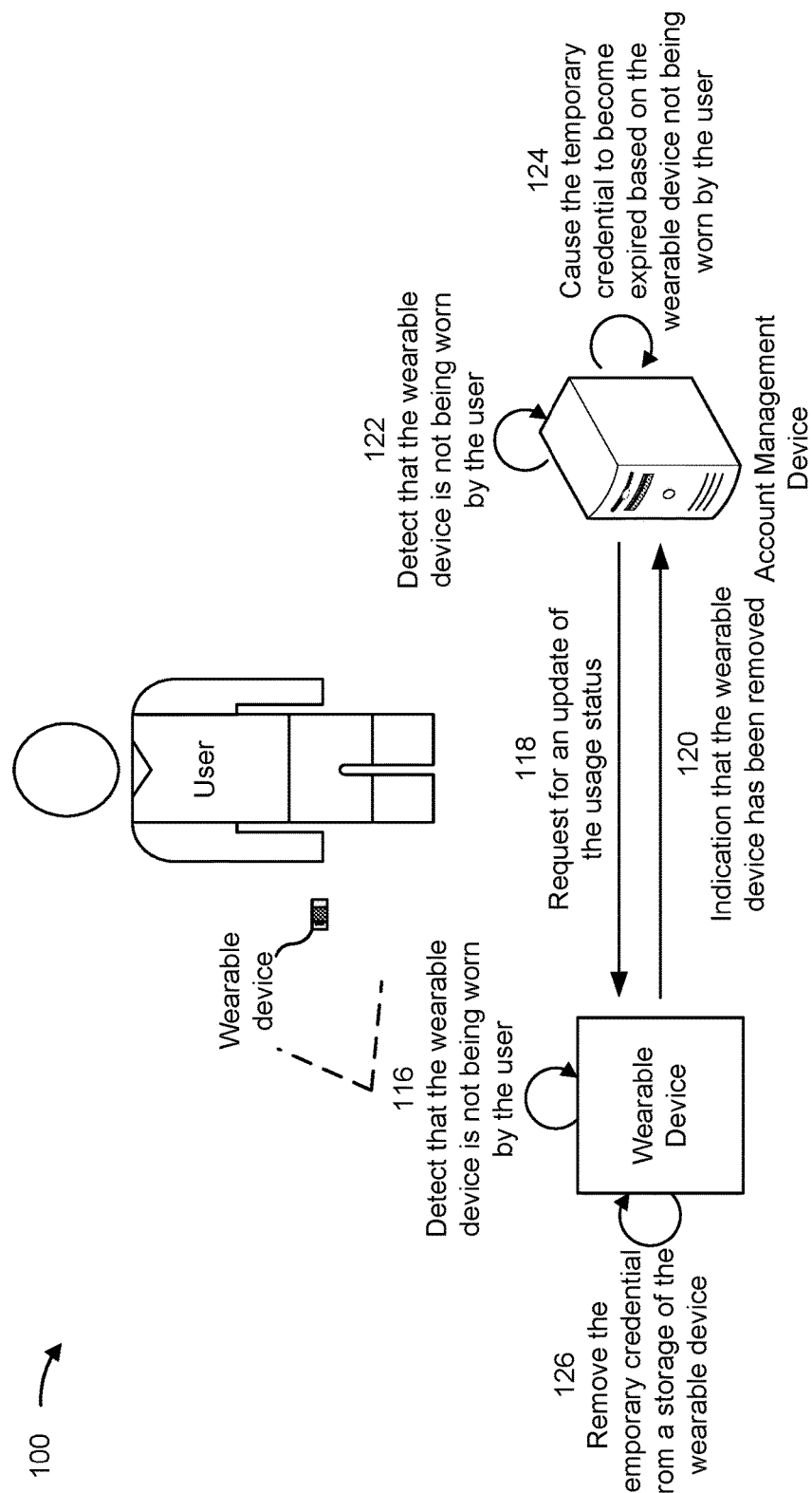

FIGS. 1A and 1B are diagrams of an example implementation relating to enhanced credential security based on a usage status of a wearable device. As shown in FIGS. 1A-1B, example 100 includes a wearable device, an account management device, and a terminal. These devices are described in more detail in connection with FIGS. 2 and 3.

In some implementations, the wearable device may communicate with the account management device to register for a contactless transaction service. For example, in some implementations, a user of the wearable device may be associated with a primary payment credential, such as a transaction card, that is issued or otherwise managed by the account management device. Accordingly, when the wearable device is used to register for the contactless transaction service, the credential device may create a record that associates the primary payment credential with one or more attributes associated with the user and the wearable device. For example, the record may include a unique identifier associated with the user, such as a username (e.g., the user's legal name and/or a login name used to access an account associated with the primary payment credential), which may be stored in association with the primary payment credential (e.g., a credit card number and associated information, such as an expiration date and/or a card verification value (CVV) or other security code). Furthermore, in some implementations, the record may include other information associated with the user, such as a mailing address and/or a billing address. In some implementations, the user may use a payment application executing on the wearable device to register for the contactless transaction service. In some implementations, the user may use another device, such as a user device associated with the user, to register for the contactless transaction service.

In some implementations, the record that is created, stored, or otherwise managed by the account management device may include a unique identifier associated with the wearable device. For example, the unique identifier may be a telephone number associated with the wearable device, a serial number associated with the wearable device, and/or an identifier that uniquely identifies the wearable device on a wireless network (e.g., an international mobile equipment identity, an international mobile subscriber identity, and/or a media access control address, among other examples). Accordingly, as described herein, the unique identifier may create a binding between the user and the wearable device operated by the user, such that the account management device can identify the user based on a message that is transmitted from the wearable device to the account management device. For example, when the user transmits a message from the wearable device to the account management device to initiate a contactless credential exchange at a terminal, the account management device may identify the user that transmitted the message based on the unique identifier of the wearable device that was used to transmit the message. In this way, the account management device may identify the primary payment credential (and/or related information) that is associated with the user, whereby the account management device may generate a virtual credential that is linked to the primary payment credential to facilitate a contactless transaction at the terminal.

In some implementations, when the user registers for the contactless transaction service, the account management device may present one or more options associated with the contactless transaction service to the user via the wearable device. For example, the credential device may provide the user with an option to use the contactless transaction service for in-person transactions at a physical point-of-sale (PoS) terminal, for online transactions at a virtual PoS terminal, and/or for person-to-person payments, among other examples. Additionally, or alternatively, the account management device may provide the user with an option to generate a temporary credential (e.g., a virtual credential) for contactless transactions associated with the wearable device.

Although examples described herein are associated with contactless transactions via a wearable device, temporary credentials or virtual credentials may be used for other purposes or operations in a similar manner as described herein. For example, a temporary credential may be used to establish an authenticated session associated with the user and/or an account (e.g., associated with a platform, a service, or an application), such as a session associated with an automated teller machine (ATM) or similar device. The authenticated session may be maintained based on the usage status indicating that the wearable device is being worn by the user. The authenticated session may be terminated based on the usage status indicating that the wearable device has been removed from the user (e.g., in a similar manner as described herein in connection with invalidating or expiring a temporary credential).

As shown in FIG. 1A, and by reference number 102, the account management device may receive a request to generate a temporary credential associated with an account of the user. The account may be a credit card account, a payment account, a debit account, an account associated with a credential (e.g., an account associated with a password), and/or an account associated with authenticated sessions (e.g., where a credential is used to initiate an authenticated session), among other examples. The account management device may receive the request to generate the temporary credential from the wearable device or another device associated with the user, such as a user device, a mobile phone, or a computer, among other examples. For example, the user may request that the temporary credential be generated via an application executing on the wearable device or another device, such as a payment application and/or an application associated with a digital wallet, among other examples. In some implementations, the request to generate the temporary credential may indicate one or more restrictions associated with the temporary credential, such as a merchant restriction (e.g., indicating one or more merchants linked to the temporary credential) and/or a temporal restriction (e.g., indicating an expiration time at which the temporary credential will automatically expire), among other examples. In some implementations, the temporary credential may not be associated with an expiration time. For example, the temporary credential may be temporary only in that the temporary credential is invalidated or expired if the wearable device is removed from the user, as explained in more detail elsewhere herein. In other words, the temporary credential may remain valid so long as the wearable device is worn by the user.

In some implementations, the request to generate the temporary credential may indicate authentication information associated with the user, such as a login and password, an account identifier (e.g., an account number) associated with the account, and/or a security code, among other examples. The account management device may authenticate the user using the authentication information. For example, the account management device may determine whether the authentication information provided by the user is valid (e.g., matches stored information associated with the account).

The account management device may generate the temporary credential associated with the account. For example, the account management device may generate the temporary credential based on authenticating the user and/or the account. The account management device may link the temporary credential with a primary credential associated with the account (e.g., to enable the temporary credential to be used as a substitute for the primary payment credential in a transaction or to initiate an authenticated session). Therefore, if the account management device receives an indication of the temporary credential (e.g., from a terminal or another device), then the account management device may be enabled to identify the primary credential associated with the account (e.g., that is linked with the temporary credential), thereby enabling the account management device to identify the account and perform one or more actions associated with the account, such as approving a transaction or initiating an authenticated session.

As shown by reference number 104, the account management device may transmit, and the wearable device may receive, an indication of the temporary credential (e.g., to be stored by the wearable device). In some implementations, the wearable device may receive the indication of the temporary credential from another device, such as a user device or a mobile phone (e.g., the account management device may transmit the indication of the temporary credential to the user device and the user device may forward the temporary credential to the wearable device), such as in scenarios where the wearable device does not have access to, or is not capable of communicating via, wide area cellular networks and/or wireless local area networks. The wearable device may receive the indication of the temporary credential via an application executing on the wearable device, such as a payment application and/or an application associated with a digital wallet, among other examples. As shown by reference number 106, the wearable device may store the temporary credential in a memory associated with the wearable device. For example, the memory may be associated with the application executing on the wearable device (e.g., the application that is associated with facilitating contactless transactions, such as a payment application and/or an application associated with a digital wallet, among other examples).

As shown by reference number 108, the wearable device may detect whether the wearable device is being worn by the user. For example, the wearable device may monitor the usage status of the wearable device. The wearable device may monitor the usage status of the wearable device via one or more sensors associated with the wearable device. For example, the one or more sensors may include a biometric sensor (e.g., an electric heart rate sensor, a blood pressure sensor, a blood oxygen level sensor, an electrocardiogram sensor, an optical heart rate sensor, and/or other types of biometric sensors), a motion sensor, and/or an accelerometer, among other examples. For example, the wearable device may detect that the wearable device is being worn by the user based on one or more biometric sensors being able to measure biometric information of the user (e.g., thereby indicating that the wearable device is being worn by the user because if the wearable device was not being worn, then the biometric sensor(s) would not be able to measure the biometric information). The wearable device may detect that the wearable device is not being worn by the user based on one or more biometric sensors not being able to measure biometric information of the user. As another example, the wearable device may detect that the wearable device has been removed from the user based on motion measurements or acceleration measurements performed by the wearable device.

In some implementations, the account management device may transmit the indication of the temporary credential based on receiving an indication that the usage status of the wearable device indicates that the wearable device is being worn by the user. In some implementations, the account management device may activate or otherwise cause the temporary credential to be usable based on receiving an indication that the usage status of the wearable device indicates that the wearable device is being worn by the user.

As shown by reference number 110, the wearable device and the account management device may communicate to identify the usage status of the wearable device. For example, the wearable device and the account management device may exchange one or more messages over time that indicate the usage status of the wearable device. In some implementations, such as in scenarios where the wearable device does not have access to, or is not capable of communicating via, wide area cellular networks and/or wireless local area networks, the wearable device may transmit an indication of the usage status of the wearable device to another device (e.g., a user device) and the other device may forward the indication of the usage status of the wearable device to the account management device, in a similar manner as described herein.

In some implementations, the wearable device and the account management device may communicate in accordance with a periodic schedule to monitor the usage status of the wearable device. For example, the wearable device may periodically transmit, to the account management device, indications of the usage status of the wearable device (e.g., in a usage status report that may indicate a usage of the wearable device since a most recently transmitted usage status report). In some implementations, the wearable device may only transmit an indication to the account management device if the wearable device detects that the wearable device has been removed from the user (e.g., as described in more detail elsewhere herein). In such examples, the account management device may assume that the wearable device is being worn by the user unless the account management device receives the indication that the wearable device has been removed from the user.

In some implementations, the account management device may transmit a request for an update of the usage status of the wearable device. For example, the account management device may periodically transmit a message to the wearable device to trigger the wearable device to transmit an indication of a current usage status of the wearable device (e.g., at a time when the request is received). In other words, the account management device may trigger the wearable device to provide updates regarding the usage status of the wearable device. This may have the advantage that the account management device is not relying on the wearable device to provide the updates of the usage status. For example, in some cases, a battery of the wearable device may run out of charge (e.g., may die). In such examples, if the account management device were to rely solely on the wearable device to provide updates of the usage status, the account management device may assume that the wearable device is still being worn by the user when in reality the wearable device has been removed from the user, but the battery of the wearable device has died, thereby preventing the wearable device from transmitting the indication of the usage status. Therefore, the account management device may treat a lack of a response to the request for an update of the usage status of the wearable device as an indication that the wearable device has been removed from the user, thereby improving a security of the account.

As shown by reference number 112, the account management may maintain the validity of the temporary credential if the wearable device is being worn by the user. For example, if the usage status of the wearable device indicates that the wearable device is being worn by the user, then the account management device may maintain the validity of the temporary credential (e.g., subject to any other restrictions that are associated with the temporary credential, such as a temporal restriction). For example, in cases where the temporary credential is used to initiate an authenticated session associated with the account (e.g., where the session is authenticated using the temporary credential), the account management device may maintain the authenticated session based on the usage status indicating that the wearable device is being worn by the user (e.g., the account management device may enable the authenticated session to remain active). As another example, in cases where the temporary credential is used to initiate an exchange, the account management device may maintain the temporary credential as a valid credential for initiating exchanges associated with the account (e.g., subject to any other restrictions that are associated with the temporary credential, such as a merchant restriction) based on the usage status indicating that the wearable device is being worn by the user.

In some implementations, as shown by reference number 114, the wearable device may transmit, to the terminal, an indication of the temporary credential to initiate an exchange associated with the account. As used herein, "exchange" may refer to a transaction, an electronic exchange, a sale, a purchase, and/or a transfer, among other examples. For example, "exchange" and "transaction" may be used interchangeably herein. The wearable device may transmit the indication of the temporary credential via a wireless communication technique, such as near-field communication, among other examples. For example, the wearable device may detect that the wearable device is within a communicative proximity of the terminal. The wearable device may transmit the indication of the temporary credential based on detecting that the wearable device is within the communicative proximity of the terminal. Therefore, the exchange may be a contactless exchange (e.g., that is initiated by the wearable device being placed within a communicative proximity of the terminal). In some implementations, the exchange may be initiated using the temporary credential, but not via the wearable device. For example, another device, such as a user device, a mobile phone, or a transaction card, among other examples, may provide the indication of the temporary credential to the terminal.

The terminal may communicate with the account management device and/or another device to determine whether to approve the exchange. For example, the terminal may transmit an indication of the temporary credential and other transaction information (e.g., a merchant associated with the exchange, an amount of the exchange, a date of the exchange, a time of the exchange, and/or a geographic location of the exchange, among other examples) to the account management device. The account management device may determine whether to approve the exchange based (e.g., at least in part) on the temporary credential. For example, the account management device may determine whether the temporary credential is valid (e.g., based on the wearable device being worn by the user). Additionally, the account management device may determine whether the transaction information satisfies other restrictions associated with the account, such as whether the merchant is an approved merchant for the temporary credential. The account management device may identify the account based on the temporary credential being linked to the account and/or the primary credential associated with the account. The account management device may transmit, to the terminal, an indication of whether the exchange is approved or denied. Therefore, the temporary credential may be used to initiate exchanges associated with the account (e.g., so long as the wearable device is being worn by the user).

As shown in FIG. 1B, and by reference number 116, the wearable device may detect that the wearable device is not being worn by the user (e.g., that the wearable device has been removed from the user). For example, the wearable device may detect, via the one or more sensors and based on monitoring the usage status, that the wearable device has been removed from the user. In some implementations, the wearable device may detect that the wearable device has been removed from the user for a threshold amount of time. The wearable device may detect that the wearable device is not being worn by the user via the one or more sensors of the wearable device. For example, the wearable device may detect that the wearable device is unable to monitor or measure biometric information associated with the user for the threshold amount of time. The threshold amount of time may enable the wearable device to account for errors in measurements by the one or more sensors and/or scenarios in which the user removes the wearable device temporarily (e.g., for less than the threshold amount of time, such as to adjust a fit of the wearable device on the user or to clean the wearable device). Therefore, using the threshold amount of time to detect that the wearable device has been removed from the user may prevent the temporary credential from being invalidated in scenarios where there are errors in measurements by the one or more sensors and/or in which the user removes the wearable device temporarily.

In some implementations, as shown by reference number 118, the account management device may transmit, and the wearable device (or another device) may receive, a request for an update of the usage status of the wearable device. For example, as described elsewhere herein, the account management device may periodically request (e.g., may periodically ping) that the wearable device transmit an update of the usage status (e.g., to transmit a usage status report). In such examples, as shown by reference number 120, the wearable device may transmit, in response to the request from the account management device, an indication that the wearable device has been removed from the user, to cause the temporary credential to be expired or invalidated. For example, the wearable device may receive the request for an update of the usage status of the wearable device, and transmit the indication that the wearable device has been removed from the user based on receiving the request for the update of the usage status.

Additionally, or alternatively, the wearable device may transmit an indication that the wearable device has been removed from the user to cause the temporary credential to be expired or invalidated in accordance with a periodic schedule (e.g., with, or without, receiving the request from the account management device). For example, the indication that the wearable device has been removed from the user is included in a usage status report associated with the wearable device. The wearable device may transmit the usage status report in accordance with a periodic schedule. Additionally, or alternatively, the wearable device may transmit an indication that the wearable device has been removed from the user to cause the temporary credential to be expired or invalidated based on detecting that the wearable device has been removed from the user (e.g., for the threshold amount of time). For example, detecting that the wearable device has been removed from the user (e.g., for the threshold amount of time) may trigger the wearable device to transmit the indication that the wearable device has been removed from the user to cause the temporary credential to be expired or invalidated.

In some implementations, the temporary credential is associated with an expiration time at which the temporary credential will automatically expire. The wearable device may detect that the wearable device is not being worn by the user at a time prior to the expiration time at which the temporary credential will automatically expire. As a result, the wearable device may transmit, at the time prior to the expiration time, the indication that the wearable device has been removed from the user to cause the temporary credential to be expired or invalidated prior to the expiration time based on the wearable device being removed from the user.

As shown by reference number 122, the account management device may detect that the wearable device has been removed from the user. In some implementations, the account management device may detect that the wearable device has been removed from the user at a time prior to the expiration time associated with the temporary credential. For example, the account management device may detect that the wearable device has been removed from the user for the threshold amount of time (e.g., in a similar manner as described above). In some implementations, the account management device may detect that the wearable device has been removed from the user based on receiving the indication that the wearable device has been removed from the user (e.g., from the wearable device or from another device associated with the wearable device). For example, in cases where the account management device transmits the request for an update of the usage status of the wearable device, the account management device may detect that the wearable device has been removed from the user based on receiving, in response to the request for the update of the usage status, an indication that the wearable device has been removed from the user. Alternatively, the account management device may detect that the wearable device has been removed from the user based on detecting that no response to the request for the update of the usage status has been received within a threshold amount of time from transmitting the request for the update of the usage status. This may enable the account management device to detect that a battery of the wearable device has died or that the wearable device is otherwise unable to communicate. Therefore, the account management device may cause the temporary credential to be invalidated or expired (e.g., as explained in more detail elsewhere herein) to improve a security of the account because the account management device is unable to determine whether the wearable device is still being worn by the user.

As shown by reference number 124, the account management device may perform an action to cause the temporary credential to be expired or invalidated based on the wearable device being removed from the user. In some implementations, such as when the temporary credential is associated with an expiration time, the account management device may perform an action to cause the temporary credential to be expired or invalidated prior to the expiration time based on the wearable device being removed from the user. For example, the account management device may perform an action to secure the virtual credential based on communicating with the wearable device and based on the usage status. For example, the action may include maintaining a validity of the virtual credential based on the usage status indicating that the wearable device is being worn by the user (e.g., as explained in more detail elsewhere herein). Alternatively, the account may include invalidating the virtual credential based on the usage status indicating that the wearable device has been removed from the user.

In some implementations, such as where the temporary credential is used to initiate an authenticated session associated with the user, the action may include terminating the authenticated session based on detecting that the wearable device is no longer being worn by the user and/or based on the usage status indicating that the wearable device has been removed from the user. In some implementations, the action may include removing a link, or association, between the temporary credential and the account or a primary credential of the account.

As a result, if the temporary credential is used to perform an action associated with the account after the account management device detects that wearable device has been removed from the user, the account management device may reject, deny, or otherwise prevent the action from being performed or completed. For example, if a transaction is initiated using the temporary credential after the account management device detects that wearable device has been removed from the user, the account management device may deny the transaction. As another example, if a request to initiate an authenticated session using the temporary credential is received after the account management device detects that wearable device has been removed from the user, the account management device may reject the request. As a result, security associated with the account may be improved because the validity of the temporary credential may be linked to the usage status of the wearable device. For example, if the wearable device is stolen, or otherwise obtained, by a malicious actor, then the malicious actor may be unable to use the wearable device to perform actions and/or initiate transactions associated with the account because the temporary credential stored by the wearable device would be invalidated when the wearable device was removed from the user.

In some implementations, as shown by reference number 126, the wearable device may remove the temporary credential from a storage or memory of the wearable device based on detecting that the wearable device has been removed from the user. For example, the wearable device may remove the temporary credential from a storage or memory associated with an application executing on the wearable device (e.g., a payment application that facilitates contactless transactions). As a result, the wearable device may be prevented from transmitting an indication of the temporary credential (e.g., to initiate a transaction or another action associated with the account) after the wearable device detects that the wearable device has been removed from the user (e.g., because the temporary credential has been removed from a memory or storage of the wearable device). As a result, a security associated with the account may be improved because the wearable device may not transmit an indication of the temporary credential after the wearable device is no longer worn by the user. Therefore, even if the account management device does not detect that the wearable device is no longer worn by the user (e.g., due to a failure in a communication or a delay in a communication), the wearable device may not transmit an indication of the temporary credential after the wearable device is no longer worn by the user, thereby reducing a likelihood that a malicious actor is able to use the wearable device to perform actions and/or initiate transactions associated with the account using the temporary credential because the temporary credential is removed from a storage or memory of the wearable device.

As indicated above, FIGS. 1A and 1B are provided as an example. Other examples may differ from what is described with regard to FIGS. 1A and 1B.

Figure 2:
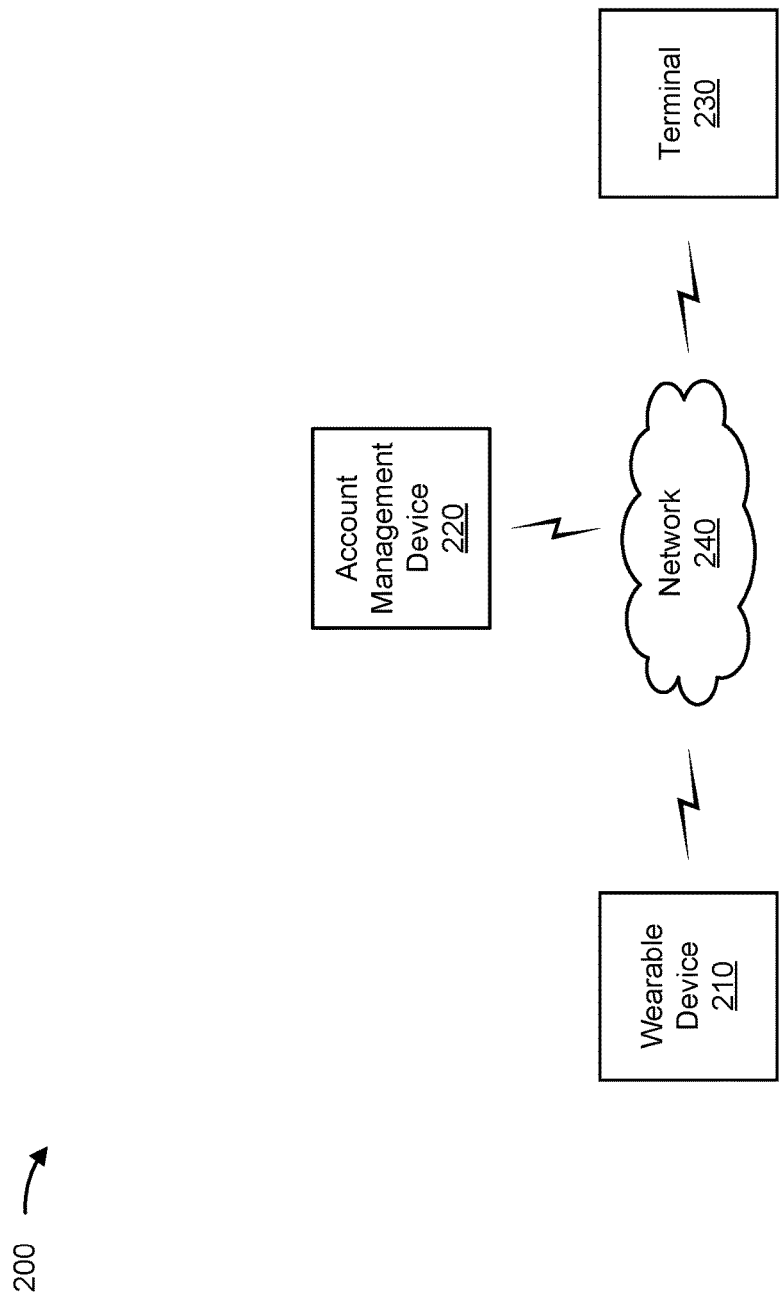
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a wearable device 210, an account management device 220, a terminal 230, and a network 240. Devices of environment 200 may interconnect via wired connections, wireless connections, or a combination of wired and wireless connections.

The wearable device 210 includes one or more devices capable of receiving, generating, storing, processing, and/or providing information associated with enhanced credential security based on a usage status of the wearable device 210, as described elsewhere herein. The wearable device 210 may include a communication device and/or a computing device. For example, the wearable device 210 may include a wireless communication device, a mobile phone, a user equipment, a wearable communication device (e.g., a smart watch, a band, a bracelet, a pair of smart eyeglasses, a head mounted display, or a virtual reality headset), or a similar type of device. In some implementations, the wearable device 210 includes one or more sensors, such as a biometric sensor, a heart rate sensor, a blood pressure sensor, a contact sensor, a motion sensor, an accelerometer, and/or similar types of sensors.

The account management device 220 includes one or more devices capable of receiving, generating, storing, processing, providing, and/or routing information associated with enhanced credential security based on a usage status of the wearable device 210, as described elsewhere herein. The account management device 220 may include a communication device and/or a computing device. For example, the account management device 220 may include a server, such as an application server, a client server, a web server, a database server, a host server, a proxy server, a virtual server (e.g., executing on computing hardware), or a server in a cloud computing system. In some implementations, the account management device 220 includes computing hardware used in a cloud computing environment.

The terminal 230 includes one or more devices capable of facilitating an electronic transaction. For example, the terminal 230 may include a point-of-sale (PoS) terminal, a payment terminal (e.g., a credit card terminal, a contactless payment terminal, a mobile credit card reader, or a chip reader), and/or an automated teller machine (ATM). The terminal 230 may include one or more input components and/or one or more output components to facilitate obtaining data (e.g., account information) from a transaction device (e.g., the wearable device 210, a transaction card, and/or a mobile device executing a payment application) and/or to facilitate interaction with and/or authorization from an owner or accountholder of the transaction device. Example input components of the terminal 230 include a number keypad, a touchscreen, a magnetic stripe reader, a chip reader, and/or a radio frequency (RF) signal reader (e.g., a near-field communication (NFC) reader), among other examples. Example output devices of terminal 230 include a display and/or a speaker, among other examples.

The network 240 includes one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
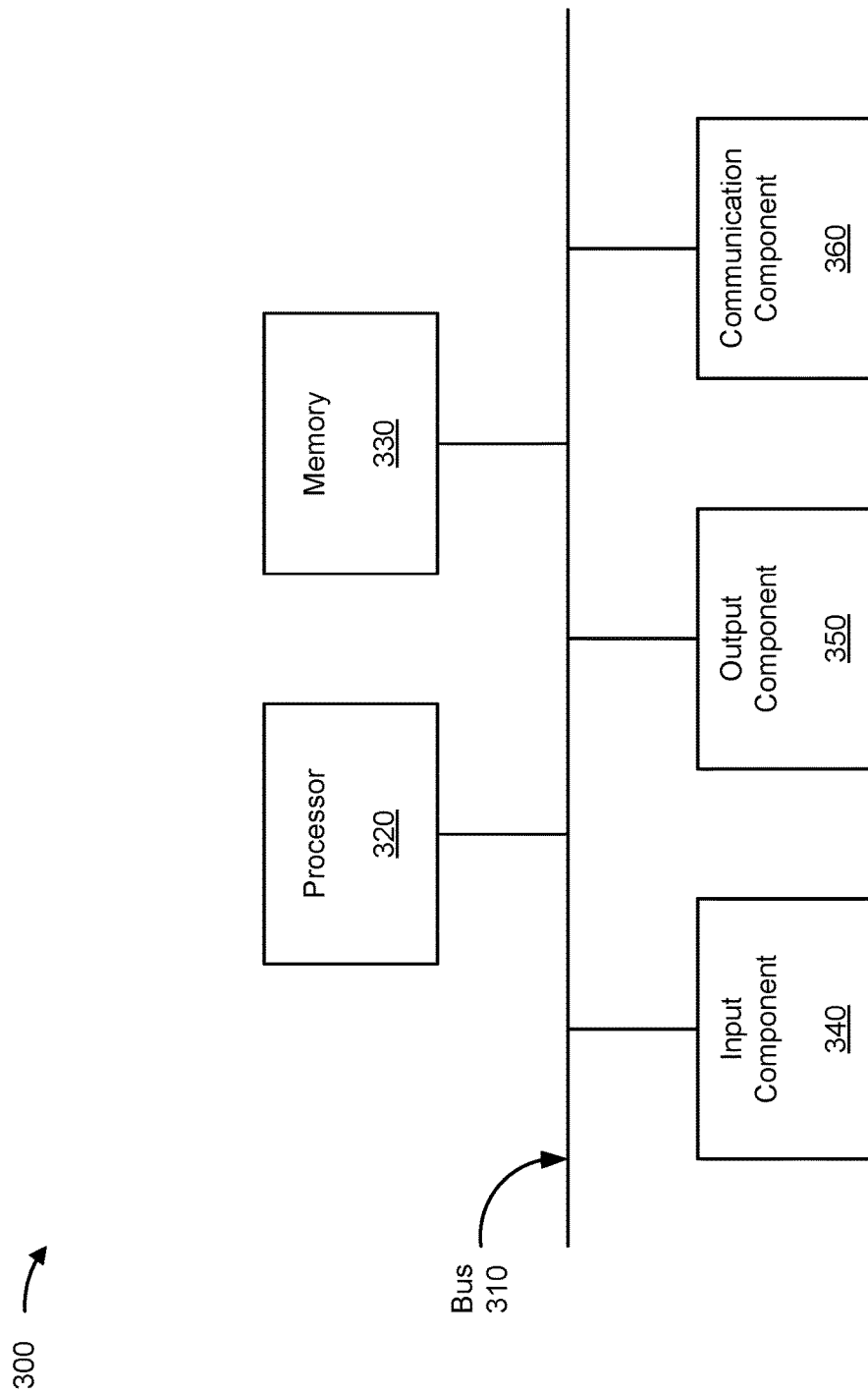
FIG. 3 is a diagram of example components of one or more devices of FIG. 2.

FIG. 3 is a diagram of example components of a device 300, which may correspond to the wearable device 210, the account management device 220, and/or the terminal 230. In some implementations, the wearable device 210, the account management device 220, and/or the terminal 230 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with enhanced credential security based on a usage status of a wearable device. In some implementations, one or more process blocks of FIG. 4 may be performed by a wearable device (e.g., the wearable device 210). In some implementations, one or more process blocks of FIG. 4 may be performed by another device or a group of devices separate from or including the wearable device, such as the account management device 220 and/or the terminal 230, among other examples. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving an indication of a temporary credential, to be stored by the wearable device, associated with an account of a user that is associated with the wearable device (block 410). In some implementations, receiving the indication of the temporary credential enables the wearable device to provide the temporary credential to a terminal, based on detecting that the wearable device is within a communicative proximity of the terminal, to initiate an exchange associated with the account.

As further shown in FIG. 4, process 400 may include monitoring, via the one or more sensors, the usage status of the wearable device (block 420). In some implementations, the usage status indicates whether the wearable device is being worn by the user. As further shown in FIG. 4, process 400 may include detecting, via the one or more sensors and based on monitoring the usage status, that the wearable device has been removed from the user for a threshold amount of time (block 430). As further shown in FIG. 4, process 400 may include transmitting, to a device associated with the account and based on detecting that the wearable device has been removed from the user, an indication that the wearable device has been removed from the user to cause the temporary credential to be expired (block 440).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A and 1B.

Figure 5:
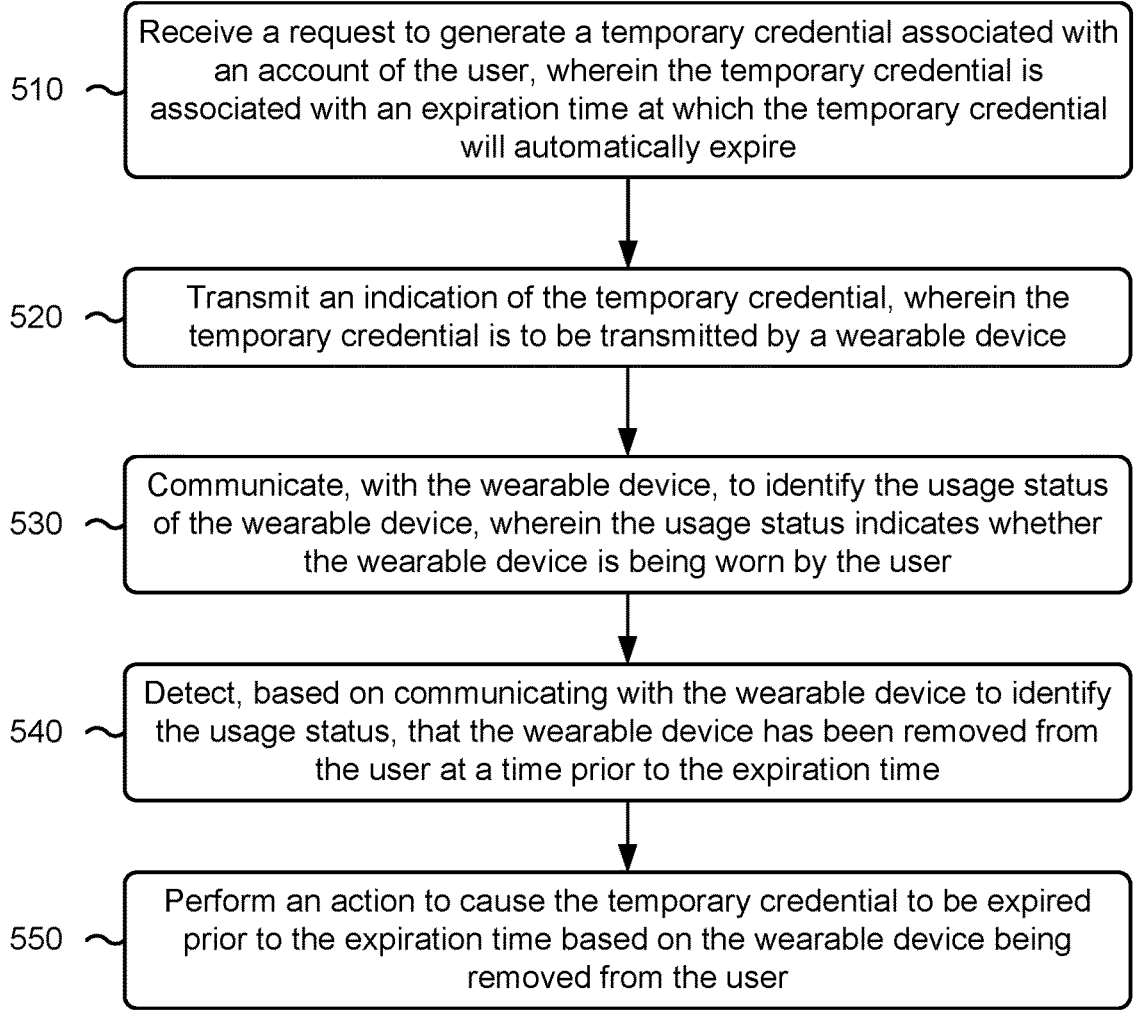

FIG. 5 is a flowchart of an example process 500 associated with enhanced credential security based on a usage status of a wearable device. In some implementations, one or more process blocks of FIG. 5 may be performed by an account management device (e.g., the account management device 220). In some implementations, one or more process blocks of FIG. 5 may be performed by another device or a group of devices separate from or including the account management device, such as the wearable device 210 and/or the terminal 230, among other examples. Additionally, or alternatively, one or more process blocks of FIG. 5 may be performed by one or more components of device 300, such as processor 320, memory 330, input component 340, output component 350, and/or communication component 360.

As shown in FIG. 5, process 500 may include receiving a request to generate a temporary credential associated with an account of the user (block 510). In some implementations, the temporary credential is associated with an expiration time at which the temporary credential will automatically expire. As further shown in FIG. 5, process 500 may include transmitting an indication of the temporary credential (block 520). In some implementations, the temporary credential is to be transmitted by the wearable device. As further shown in FIG. 5, process 500 may include communicating, with the wearable device, to identify the usage status of the wearable device (block 530). In some implementations, the usage status indicates whether the wearable device is being worn by the user. As further shown in FIG. 5, process 500 may include detecting, based on communicating with the wearable device to identify the usage status, that the wearable device has been removed from the user at a time prior to the expiration time (block 540). As further shown in FIG. 5, process 500 may include performing an action to cause the temporary credential to be expired (e.g., prior to the expiration time) based on the wearable device being removed from the user (block 550).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A and 1B.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wearable device for enhanced credential security based on a usage status of the wearable device, the wearable device comprising:
    one or more sensors;
    one or more memories; and
    one or more processors, coupled to the one or more memories, configured to:
        receive an indication of a temporary credential associated with an account of a user that is associated with the wearable device, wherein receiving the indication of the temporary credential enables the wearable device to provide the temporary credential to a terminal to initiate an exchange associated with the account, and wherein the wearable device is configured to provide the temporary credential to the terminal based on detecting that the wearable device is within a communicative proximity of the terminal;
        monitor, via the one or more sensors, the usage status of the wearable device, wherein the usage status indicates whether the wearable device is being worn by the user;
        detect, via the one or more sensors and based on monitoring the usage status, that the wearable device has been removed from the user;
        receive, from an account management device associated with the account and within a threshold amount of time of detecting that the wearable device has been removed from the user, a request for an update of the usage status of the wearable device;
        transmit, to the account management device associated with the account in response to the request for the update and based on a determination that the wearable device has been removed from the user for less than the threshold amount of time, an indication that the wearable device is being worn by the user;
        store, via a payment application executing on the wearable device, the temporary credential in accordance with the indication that the wearable device is being worn by the user; and
        remove the temporary credential from a storage associated with the payment application according to one or more restrictions associated with the temporary credential, the one or more restrictions including a temporal restriction indicating an expiration time at which the temporary credential expires irrespective of whether the wearable device is being worn by the user.

2. The wearable device of claim 1,
    wherein the one or more sensors include at least one of: a biometric sensor, a motion sensor, or an accelerometer.

3. The wearable device of claim 1,
    wherein the request for the update of the usage status received within the threshold amount of time of detecting that the wearable device has been removed from the user comprises an initial request, and wherein the one or more processors are further configured to: receive, from the account management device, a subsequent request for a subsequent update of the usage status of the wearable device in accordance with a periodic schedule.

4. The wearable device of claim 3,
    wherein the one or more processors, to transmit the indication, are configured to: transmit a usage status report in accordance with the periodic schedule, wherein the usage status report includes the indication.

5. The wearable device of claim 1,
wherein the temporary credential is a virtual card number associated with the account.

6. The wearable device of claim 1,
wherein the one or more processors, to transmit the indication, are configured to: transmit the indication at a time prior to the expiration time.

7. The wearable device of claim 1,
wherein the one or more restrictions further include a monetary restriction or a merchant restriction.

8. A method of enhanced credential security based on a usage status of a wearable device of a user, comprising:
receiving, via one or more processors of the wearable device, an indication of a temporary credential associated with an account of a user that is associated with the wearable device, wherein receiving the indication of the temporary credential enables the wearable device to provide the temporary credential to a terminal to initiate an exchange associated with the account, and wherein the wearable device is configured to provide the temporary credential to the terminal based on detecting that the wearable device is within a communicative proximity of the terminal;
monitoring, via the one or more processors, the usage status of the wearable device, wherein the usage status indicates whether the wearable device is being worn by the user;
detecting, via one or more sensors of the wearable device and based on monitoring the usage status, that the wearable device has been removed from the user;
receiving, from an account management device associated with the account and within a threshold amount of time of detecting that the wearable device has been removed from the user, a request for an update of the usage status of the wearable device;
transmitting, to the account management device associated with the account in response to the request for the update and based on a determination that the wearable device has been removed from the user for less than the threshold amount of time, an indication that the wearable device is being worn by the user;
storing, via a payment application executing on the wearable device, the temporary credential in accordance with the indication that the wearable device is being worn by the user; and
removing, via the one or more processors, the temporary credential from a storage associated with the payment application according to one or more restrictions associated with the temporary credential, the one or more restrictions including a temporal restriction indicating an expiration time at which the temporary credential expires irrespective of whether the wearable device is being worn by the user.

9. The method of claim 8,
wherein the one or more sensors include at least one of: a biometric sensor, a motion sensor, or an accelerometer.

10. The method of claim 8, further comprising:
receiving a subsequent request for a subsequent update of the usage status of the wearable device in accordance with a periodic schedule.

11. The method of claim 8, further comprising:
transmitting a usage status report in accordance with the periodic schedule, wherein the usage status report includes the indication.

12. The method of claim 8,
wherein the temporary credential is a virtual card number associated with the account.

13. The method of claim 8,
wherein transmitting the indication comprises: transmitting the indication at a time prior to the expiration time.

14. The method of claim 8,
wherein the one or more restrictions further include a monetary restriction or a merchant restriction.

15. The method of claim 8,
wherein the wearable device is a watch, a band, a bracelet, or eyeglasses.

16. A non-transitory computer-readable medium storing a set of instructions, the set of instructions comprising:
one or more instructions that, when executed by one or more processors of a wearable device, cause the wearable device to:
receive an indication of a temporary credential associated with an account of a user that is associated with the wearable device, wherein receiving the indication of the temporary credential enables the wearable device to provide the temporary credential to a terminal, based on detecting that the wearable device is within a communicative proximity of the terminal, to initiate an exchange associated with the account;
monitor, via one or more sensors of the wearable device, the usage status of the wearable device, wherein the usage status indicates whether the wearable device is being worn by the user;
detect, via the one or more sensors and based on monitoring the usage status, that the wearable device has been removed from the user;
receive, from an account management device associated with the account and within a threshold amount of time of detecting that the wearable device has been removed from the user, a request for an update of the usage status of the wearable device;
transmit, to the account management device associated with the account in response to the request for the update and based on a determination that the wearable device has been removed from the user for less than the threshold amount of time, an indication that the wearable device is being worn by the user;
store, via a payment application executing on the wearable device, the temporary credential in accordance with the indication that the wearable device is being worn by the user; and
remove the temporary credential from a storage associated with the payment application according to one or more restrictions associated with the temporary credential, the one or more restrictions including a temporal restriction indicating an expiration time at which the temporary credential expires irrespective of whether the wearable device is being worn by the user.

17. The non-transitory computer-readable medium of claim 16,
wherein the one or more sensors include at least one of: a biometric sensor, a motion sensor, or an accelerometer.

18. The non-transitory computer-readable medium of claim 16,
wherein the one or more instructions further cause the wearable device to: receive a subsequent request for a subsequent update of the usage status of the wearable device in accordance with a periodic schedule.

19. The non-transitory computer-readable medium of claim 16, wherein the temporary credential is a virtual card number associated with the account.

20. The non-transitory computer-readable medium of claim 16, wherein the virtual credential is associated with an authenticated session associated with the account.

* * * * *